3,104,238
DIAZACYCLOOCTANE DERIVATIVES
Ernst Jucker, Ettingen, Basel-land, Adolf J. Lindenmann, Basel, and John Gmünder, Muttenz, Basel-land, Switzerland, assignors to Sandoz Ltd. (also known as Sandoz A.G.), Basel, Switzerland, a Swiss firm
No Drawing. Filed Feb. 6, 1962, Ser. No. 171,351
Claims priority, application Switzerland Feb. 8, 1961
5 Claims. (Cl. 260—239)

The present invention relates to new 1,5-diazacyclooctane derivatives, their physiologically acceptable salts with acids and to a process for their production.

The new 1,5-diazacyclooctane derivatives of the present invention correspond to the general Formula I

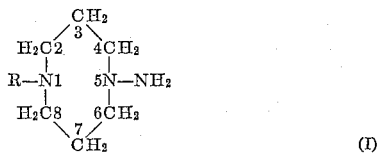
(I)

wherein R is a member selected from the group consisting of lower alkyl, lower hydroxyalkyl and lower aralkyl.

The process for the production of compounds I is characterized in that a compound of the general Formula III

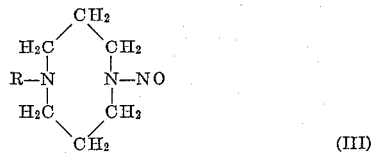
(III)

wherein R has the above significance, is reduced by a method known to effect conversion of a nitroso compound to the corresponding amino compound.

Compound II may be produced by nitrosylating a compound of the general Formula II

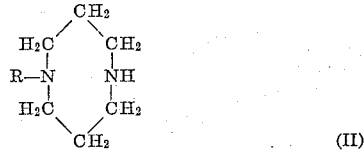
(II)

wherein R has the above significance, by a method known to convert a secondary amino compound to the corresponding N-nitroso compound.

In the above formulae, suitable values for R are for example, ethyl, propyl, isopropyl, butyl, β-hydroxy-ethyl or benzyl radicals.

The compounds I may, for example, be produced as follows: An aqueous sodium nitrite solution is allowed to react at ambient temperature with an aqueous acidic solution (pH value of 3-4) of compound II, e.g. 1-methyl-1,5-diazacyclooctane or 1-benzyl-1,5-diazacyclooctane. The reaction mixture is subsequently made alkaline, e.g. with an excess of potassium hydroxide solution whilst cooling with ice, and then exhaustively extracted with diethyl ether. The nitroso compound of Formula III is purified by known methods.

The reduction of compound III may be effected with zinc and acetic acid or with lithium aluminium hydride. The reduction with zinc and acetic acid may be effected in that zinc dust is added to an aqueous solution of compound III and dilute acetic acid is then added while cooling during the course of 30 minutes to one hour. The reaction mixture is kept at room temperature for 2-3 hours and then heated, e. g. to approximately 80° C. for 2-3 hours, so as to complete the reaction. After filtration and making the solution alkaline while cooling, the resulting amine is isolated in accordance with known methods, e.g. by extraction with an inert solvent, preferably diethyl ether and purified by distillation and/or crystallization.

When the last mentioned reduction is effected with lithium aluminium hydride, a solution of compound III in an inert organic solvent, e.g. diethyl ether, tetrahydrofuran or dioxane, is treated at the boil with lithium aluminium hydride dissolved in the same solvent; after heating for 2-4 hours, water is added and the reaction mixture made alkaline with an alkali metal hydroxide, e.g. potassium hydroxide.

With organic and inorganic acids compounds I form physiologically acceptable acid addition salts which are crystalline at room temperature. Examples of acids for forming these salts are: hydrochloric, hydrobromic, hydriodic, sulfuric, citric, oxalic, tartaric, succinic, maleic, fumaric, malic, acetic, benzoic and methanesulfonic acid.

The compounds I may be used as intermediate compounds in the production of pharmaceuticals. Thus, for example, a 3-sulfamyl-4-chloro-benzoic acid amide of general Formula IV

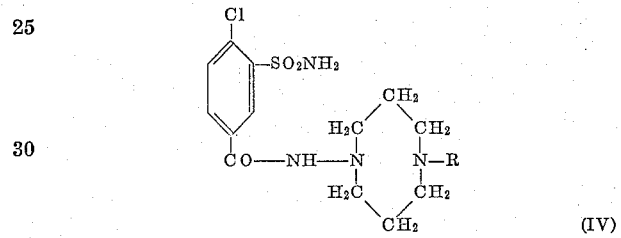
(IV)

wherein R is a lower alkyl, for example, methyl, may be produced by condensing a compound I with a 3-sulfamyl-4-chloro-benzoyl halide. Compounds IV have diuretic properties.

Compounds II may, for example, be produced by converting 1,2-trimethylene-pyrazolidine in an inert anhydrous solvent, e.g. absolute acetone, with an organic halogen compound of general formula R—Hal wherein R has the above significance and Hal is a member selected from the group consisting of chlorine, bromine and iodine, to the quaternary compound of general Formula V

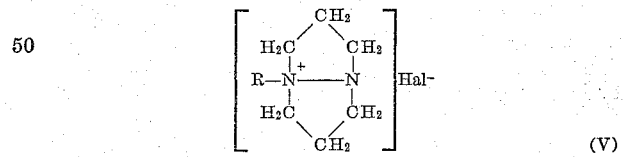
(V)

wherein R and Hal have the above significance, and subsequently reducing; the reduction is preferably effected in an open chain or cyclic ether, e.g. diethyl ether or tetrahydrofuran with amalgamated aluminium shavings.

A compound of general Formula V may also be obtained by reacting a hydrazine derivative of general Formula VI

R—NH—NH$_2$ (VI)

wherein R has the above significance, with a trimethylene dihalide.

In the following non-limitative examples all temperatures are stated in degrees centigrade and the melting and boiling points are uncorrected.

*Example 1.—1-Methyl-5-Amino-1,5-Diazacyclooctane*

(a) *1-methyl-5-nitroso-1,5-diazacyclooctane.*—A solution of 9.2 g. of 1-methyl-1,5-diazacyclooctane in 10 cc.

of distilled water is brought to a pH value of from 3 to 4 with 15.5 g. of 50% sulphuric acid whilst cooling with ice. A solution of 16.5 g. of sodium nitrite in 21.5 cc. of water is then added to the acidic solution at room temperature. After stirring for 16 hours at room temperature, an excess of solid potassium hydroxide is added whilst cooling with ice, the reaction mixture extracted with ether and the residue remaining after the evaporation of ether is distilled at a pressure of 11 mm. of Hg, the 1-methyl-5-nitroso-1,5-diazacyclooctane distilling over at 132–134°.

The 1-methyl-1,5-diazacyclooctane used as a starting material is produced as follows: 17.0 g. of methyl iodide are added to a solution of 11.2 g. of 1,2-trimethylene-pyrazolidine (boiling point 169–171°) in 200 cc. of absolute acetone, which has been cooled in an ice bath. After standing for one hour, the colourless precipitate is filtered off and the resulting 1-methyl-trimethylene-pyrazolidinium iodide is then crystallized from isopropanol. Melting point 250–251°. 27 g. of amalgamated aluminium shavings are covered with a layer of 400 cc. of ether, cooled in an ice bath and after the addition of 30.5 g. of 1-methyl-trimethylene-pyrazolidinium iodide 55 cc. of water are added during the course of one hour with occasional shaking. The reaction mixture is slowly heated and boiled at reflux over night. An excess of potassium hydroxide is added whilst cooling with ice, the ethereal phase separated and the residue exhaustively extracted with ether. After evaporation in a vacuum the combined ethereal solutions yield pure 1-methyl-1,5-diazacyclooctane having a boiling point of 175–176°.

(b) *1-methyl-5-amino-1,5-diazacyclooctane.*—25 g. of zinc dust are added to a solution of 6.9 g. of 1-methyl-5-nitroso-1,5-diazacyclooctane in 35 cc. of water and 25 g. of 75% acetic acid are then added during the course of 45 minutes whilst cooling with ice and stirring. The reaction mixture is stirred for three hours at room temperature and then heated for 2½ hours to 80° in an oil bath. The mixture is then filtered whilst hot, an excess of solid potassium hydroxide added after cooling in an ice bath and extracted three times, each time with 100 cc. of ether. After evaporation the combined ethereal solutions yield a colourless oil which is dissolved in ethanol and converted to the hydrobromide with 48% hydrobromic acid. The resulting 1-methyl-5-amino-1,5-diazacyclooctane dihydrobromide is purified as follows: The dihydrobromide is dissolved in the minimum amount of hot 48% hydrobromic acid and ethanol is added, the pure dihydrobromide crystallizing. Melting point 197–199° (decomposition).

*Example 2.—1-Methyl-5-Amino-1,5-Diazacyclooctane*

The 1-methyl-5-nitroso-1,5-diazacyclooctane obtained from Example 1(a) may also be reduced to the desired amino derivative with lithium aluminium hydride. The process is effected as follows: A solution of 9.3 g. of 1-methyl-5-nitroso-1,5-diazacyclooctane in 70 cc. of absolute tetrahydrofuran are carefully added dropwise to a boiling solution of 4.5 g. of lithium aluminium hydride in 70 cc. of absolute tetrahydrofuran and the reaction mixture then heated for 3½ hours at reflux. After cooling in an ice bath, 18 cc. of distilled water are carefully added to the reaction mixture and after a further an excess of solid potassium hydroxide is added at 0°. The solvent is separated and the residue exhaustively extracted with ether. The combined organic phases are concentrated at reduced pressure and the residue, the 1-methyl-5-amino-1,5-diazacyclooctane distilled at a pressure of 11 mm. of Hg. Boiling point 94°/11 mm. of Hg.

*Dihydrobromide.*—The resulting base is dissolved in ethanol and a 48% hydrobromic acid added. Melting point 197–199° (decomposition).

*Example 3.—1-Isopropyl-5-Amino-1,5-Diazacyclooctane*

(a) *1-isopropyl-5-nitroso-1,5-diazacyclooctane.*—19.0 g. of 50% sulphuric acid are added to a solution of 11.3 g. of 1-isopropyl-1,5-diazacyclooctane in 10 cc. of water whilst cooling with ice and a solution of 16.5 g. of sodium nitrite in 22 cc. of water is then added at room temperature. After stirring for 24 hours at room temperature an excess of solid potassium hydroxide is added to the reaction mixture and the mixture is then exhaustively extracted with ether. The oil resulting after evaporation of ether is distilled at 12 mm. of Hg in a bulb tube, the 1-isopropyl-5-nitroso-1,5-diazacyclooctane distilling over at between 150° and 160°.

(b) *1-isopropyl-5-amino-1,5-diazacyclooctane.*—25 g. of zinc dust are added to a solution of 7.4 g. of 1-isopropyl-5-nitroso-1,5-diazacyclooctane in 35 cc. of water and 25 g. of 75% acetic acid are then added during the course of 30 minutes whilst cooling with ice. The mixture is subsequently stirred for 3 hours at room temperature and then heated for a further two hours to 80°. The mixture is then filtered whilst hot, an excess of solid potassium hydroxide is added to the clear filtrate after cooling in an ice bath and the mixture exhaustively extracted with ether. The residue remaining after evaporation of the combined ethereal solutions is distilled at 12 mm. of Hg in a bulb tube, the 1-isopropyl-5-amino-1,5-diazacyclooctane distilling over at between 110 and 115°.

The 1-isopropyl-1,5-diazacyclooctane used as a starting material is produced as follows:

75.1 g. of isopropylhydrazine hydrochloride and 360 g. of anhydrous sodium carbonate are added to a solution of 139 cc. of trimethylene dibromide in 1000 cc. of ethanol and the mixture is subsequently heated to the boil for 8 hours. After cooling to approximately 0° the insoluble salt is filtered off and the filtrate evaporated in a vacuum. The resulting residue is exhaustively extracted with ether so as to remove neutral impurities which are soluble in ether. The resulting residue is added to 60 g. of amalgamated aluminium shavings which are covered with 750 cc. of ether and a total of 130 cc. of distilled water are then added portionwise whilst cooling with ice. The reaction mixture is left to stand for approximately 12 hours, at first at approximately 0° and then at room temperature. At approximately 0° an excess of solid potassium hydroxide is then added to the reaction mixture, the organic phase is separated and the residue exhaustively extracted with ether. The combined ethereal solutions are evaporated and the residue distilled at a pressure of 9 mm. of Hg, the 1-isopropyl-1,5-diazacyclooctane distilling over at between 85 and 86°.

*Example 4.—1-Benzyl-5-Amino-1,5-Diazacyclooctane*

(a) *1 - benzyl-5-nitroso-1,5-diazacyclooctane.*—10.1 g. of 50% sulphuric acid are added to a solution of 9.5 g. of 1-benzyl-1,5-diazacyclooctane in 10 cc. of water at 0–5° and a solution of 3.5 g. of sodium nitrite in 5.0 cc. of water is subsequently added. After stirring for 3 hours at room temperature and after the addition of 50 cc. of ether, an excess of solid potassium hydroxide is added to the reaction mixture whilst cooling well with water and the precipitate is subsequently filtered off. The ethereal phase of the filtrate is separated off and the aqueous phase is extracted a further two times, each time with 50 cc. of ether. The combined ethereal solutions are dried over magnesium sulphate and concentrated. The resulting residue is distilled at 0.02 mm. of Hg, 1-benzyl-5-nitroso-1,5-diazacyclooctane coming off at between 142 and 147°.

(b) *1 - benzyl-5-amino-1,5-diazacyclooctane.*—A solution of 9.7 g. of 1-benzyl-5-nitroso-1,5-diazacyclooctane in 70 cc. of absolute tetrahydrofuran is added dropwise to a boiling solution of 3.2 g. of lithium aluminium hydride in 70 cc. of absolute tetrahydrofuran during the course of 2½ hours whilst stirring and the reaction mixture is heated at reflux for a further 4½ hours. After cooling in an ice bath 15 cc. of water are carefully added and an excess of solid potassium hydroxide is added after a further half hour. The solvent is separated and the residue exhaustively extracted with ether. The residue remaining after evaporation of ether is distilled at a pressure of 13 mm. of Hg, the 1-benzyl-5-ammino-1,5-diazacyclooctane distilling over at 180 and 182°.

The 1-benzyl-1,5-diazacyclooctane used as a starting material is produced in a manner analogous to the production of 1-isopropyl-1,5-diazacyclooctane (Example 3) by condensing trimethylene dibromide with benzyl hydrazine and reducing the resulting 1-benzyl-1,2-trimethylene-pyrazolidinium-bromide with amalgamated aluminium shavings. Boiling point 155–158°/10 mm. of Hg.

*Example 5.—1-(β-Hydroxyethyl)-5-Amino-1,5-Diazacyclooctane*

(a) *1 - (β - hydroxyethyl)-5-nitroso-1,5-diazacyclooctane.*—Whilst cooling with ice 21.5 of 50% sulphuric acid are added to a solution of 15.8 g. of 1-(β-hydroxyethyl)-1,5-diazacyclooctane in 14 cc. of distilled water, a solution of 7.6 g. of sodium nitrite in 10 cc. of distilled water is subsequently added whilst stirring at 0–5°. After stirring for 17 hours at room temperature an excess of solid potassium hydroxide is added whilst cooling well with ice and the reaction mixture exhaustively extracted with tetrahydrofuran. The combined extracts are subsequently concentrated and the residue distilled at a pressure of 0.03 mm. of Hg, 1-(β-hydroxyethyl)-5-nitroso-1,5-diazacyclooctane distilling over at between 164 and 168°.

(b) *1-(β-hydroxyethyl)-5-amino - 1,5 - diazacyclooctane.*—A solution of 8.0 g. of 1-(β-hydroxyethyl)-5-nitroso-1,5-diazacyclooctane in 70 cc. of absolute tetrahydrofuran is added dropwise to a boiling solution of 3.2 of lithium aluminium hydride in 70 cc. of absolute tetrahydrofuran during the course of two hours whilst stirring well; the reaction mixture is subsequently heated at reflux for 8 hours. The mixture is then cooled in an ice bath and 15 cc. of distilled water are carefully added dropwise. An excess of solid potassium hydroxide is added to the reaction mixture after stirring for 30 minutes in an ice bath, the organic phase is separated and the residue exhaustively extracted with ether. The residue resulting from the combined organic extracts after evaporation is distilled at 0.03 mm. of Hg, the 1-(β-hydroxyethyl)-5-amino-1,5-diazacyclooctane distilling over at 100°.

The 1-(β-hydroxyethyl)-1,5-diazacyclooctane used as a starting material is produced in a manner analogous to that described for the production of 1-isopropyl-1,5-diazacyclooctane (Example 3) by condensing trimethylene dibromide with β-hydroxyethyl hydrazine and reducing the resulting 1-(β-hydroxyethyl)-1,2-trimethylene-pyrazolidinum bromide with amalgamated aluminum shavings; the dihydrobromide is re crystallized from methanol and has a double melting point of 137–140°/180–185° (decomposition).

Having thus disclosed the invention, what is claimed is:

1. A compound selected from the group consisting of 1,5-diazacyclooctane of the formula

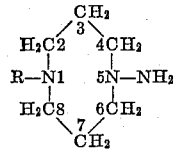

wherein R is a member selected from the group consisting of lower alkyl, lower hydroxyalkyl and phenyl lower alkyl, and the physiologically acceptable acid addition salts of said compound.

2. 1-methyl-5-amino-1,5-diazacyclooctane.
3. 1-isopropyl-5-amino-1,5-diazacyclooctane.
4. 1-benzyl-5-amino-1,5-diazacyclooctane.
5. 1-(β-hydroxyethyl)-5-amino-diazacyclooctane.

No references cited.